US006775291B1

(12) United States Patent
Ryu et al.

(10) Patent No.: US 6,775,291 B1
(45) Date of Patent: Aug. 10, 2004

(54) WIRELESS INTERNET SERVICE METHOD IN GATEWAY SYSTEM

(75) Inventors: Ji-Weon Ryu, Inchon-si (KR); Jong-Sun Yoon, Inchon-si (KR); Kyoung-Jin Kang, Kyunggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 650 days.

(21) Appl. No.: 09/641,678

(22) Filed: Aug. 18, 2000

(30) Foreign Application Priority Data

Aug. 28, 1999 (KR) .......................................... 1999-36141

(51) Int. Cl.[7] .......................... H04L 12/28; H04L 12/56
(52) U.S. Cl. ...................... 370/401; 370/338; 370/349; 370/352; 709/217; 709/218
(58) Field of Search ................................ 370/345, 349, 370/352, 389, 390, 392, 397, 468, 254, 255, 312, 313, 315, 329, 331, 338, 401; 455/414.2, 422.1, 426.1, 432.1, 432.2, 403, 436, 437, 450, 458, 502, 507, 557, 574, 457; 705/39, 51; 709/201, 203, 206, 207, 217, 218, 221, 223, 225, 227, 228, 231, 236

(56) References Cited

U.S. PATENT DOCUMENTS

| | | | | |
|---|---|---|---|---|
| 6,031,904 A | * | 2/2000 | An et al. | 379/201.02 |
| 6,041,045 A | * | 3/2000 | Alterman et al. | 370/313 |
| 6,088,594 A | | 7/2000 | Kingdon et al. | 455/457 |
| 6,393,014 B1 | * | 5/2002 | Daly et al. | 370/352 |
| 6,466,571 B1 | * | 10/2002 | Dynarski et al. | 370/352 |
| 6,501,732 B1 | * | 12/2002 | Xu et al. | 370/235 |
| 6,556,574 B1 | * | 4/2003 | Pearce et al. | 370/401 |
| 6,557,054 B2 | * | 4/2003 | Reisman | 710/33 |
| 6,600,726 B1 | * | 7/2003 | Nevo et al. | 370/278 |
| 6,611,862 B2 | * | 8/2003 | Reisman | 709/217 |
| 6,640,097 B2 | * | 10/2003 | Corrigan et al. | 370/404 |

* cited by examiner

Primary Examiner—Kenneth Vanderpuye
Assistant Examiner—Anthony Ton
(74) Attorney, Agent, or Firm—Fleshner & Kim, LLP (57) ABSTRACT

A method of providing wireless Internet service in a gateway system having a conversation function according to short messages includes storing and managing the latest URL web contents in a URL memory using the TTL, expire time and last modification time for URL web contents. Web contents corresponding to URL information requested by a mobile terminal are parsed and stored in a cache, and then transmitted to the mobile terminal through I-SMSC. The service method stores and manages the latest URL web contents in the URL memory using the TTL, expire time and last modification time for URL web contents to directly access the Internet. Thus, the service method provides the URL web contents to the mobile terminal when there is a request for URL information from a mobile terminal supporting no WAP standard for URL information which does not exist in the URL memory. Accordingly, quick Internet service for the last web contents is available, and in case of an update of bookmarked URL information defined by a subscriber, it is possible to inform the subscriber of the updated URL information.

22 Claims, 6 Drawing Sheets

Fig. 1

Background Art

Fig. 2

Background Art

WIRELESS INTERNET SERVICE METHOD IN GATEWAY SYSTEM

BACKGROUND OF THE INVENTION

1. Field of the Invention

The present invention relates to a wireless Internet service method, and in particular, to a wireless Internet service method in a gateway system, which provides wireless Internet services to a mobile terminal.

2. Background of the Related Art

Communication services ranging from a voice service to message and data communication services are continuously developing in a general radio communication network. Currently, there is a trend to provide improved Internet services to radio communication network subscribers through a combination of the radio communication and Internet called resources of information, which will provide access to an unlimited additional services to the subscribers.

Further, a number of mobile communication subscribers is on the increase, and there are various kinds of mobile terminals. While common radio communication network carriers provide a variety of additional services to the subscribers, related art mobile terminals are not capable of receiving all the services including Internet service because of a shortage of functions. Accordingly, these related art mobile terminals can only use a specific service even if the additional services are improved.

Meantime, wireless application protocol (WAP) Forum is a leading one of the many standardizing processes being processed for the Internet services using the mobile terminal in the radio communication network. To use the Internet service using the mobile terminal, the mobile terminal is required to provide a WAP standard, that is, a WAP protocol and a WAP browser function. Accordingly, a related art radio communication network subscriber who uses the related art mobile terminal, which cannot support the WAP standard, should replace his/her mobile terminal to receive the Internet service.

Figure 1:
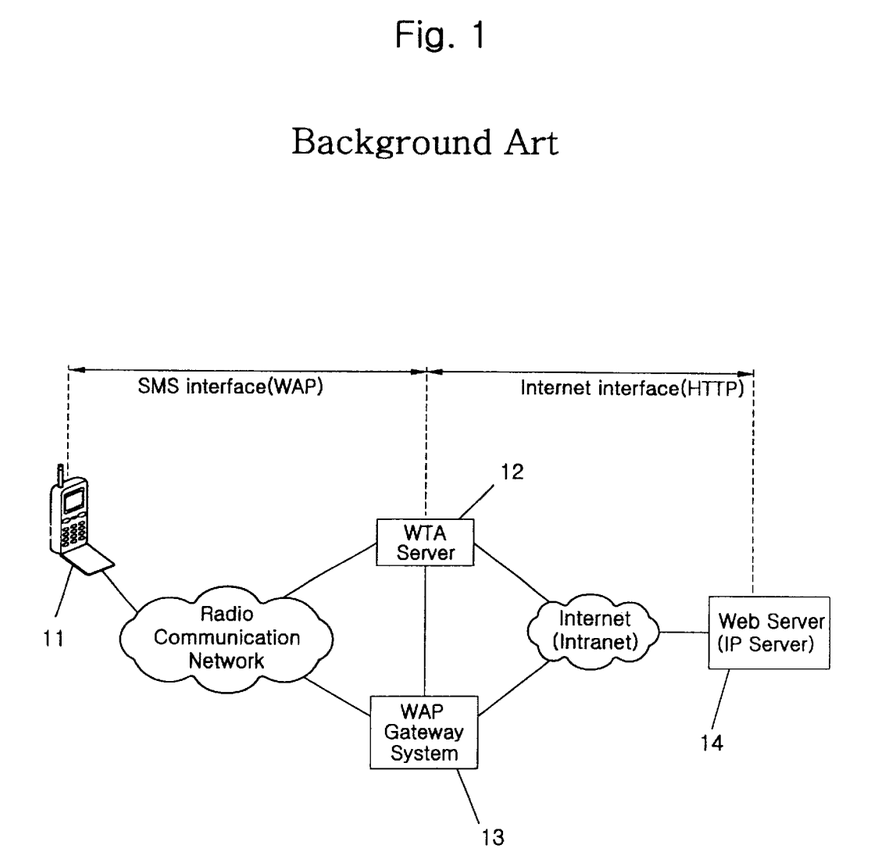
FIG. 1 is a diagram that shows a related art configuration for accessing wireless Internet.

This situation will now be described in additional detail with reference to FIG. 1 that illustrates a related art configuration for accessing the Internet. In case of the Internet service supported by the WAP Forum, a mobile terminal 11 providing the WAP browser function and a web server (WAP service) 14 are connected to each other through a radio communication network and Internet (Intranet). As shown in FIG. 1, the radio communication network uses a Short Message Service (SMS) interface supporting communications based on the WAP protocol while the Internet (Intranet) uses an interface supporting communications based on Hyper Text Transfer Protocol (HTTP). Accordingly, connection of the mobile terminal 11 and web server 14 requires a WAP gateway system 13 that furnishes a protocol conversion function for converting the WAP protocol of the radio communication network into the HTTP of the Internet and vice versa, and a function for encoding/decoding Wireless Markup Language (WML) contents for communication with the radio communication network.

In the case of Wireless Telephony Application (WTA) service 12, it provides additional services closely related to telephone communication while carrying out HTTP communication with the WAP gateway system 13. When used as a web server, however, the WTA server 12 has a special application process having an interface with the radio communication network mounted thereon to operate a user agent for WTA service in the WAP browser of the mobile terminal 11.

Figure 2:
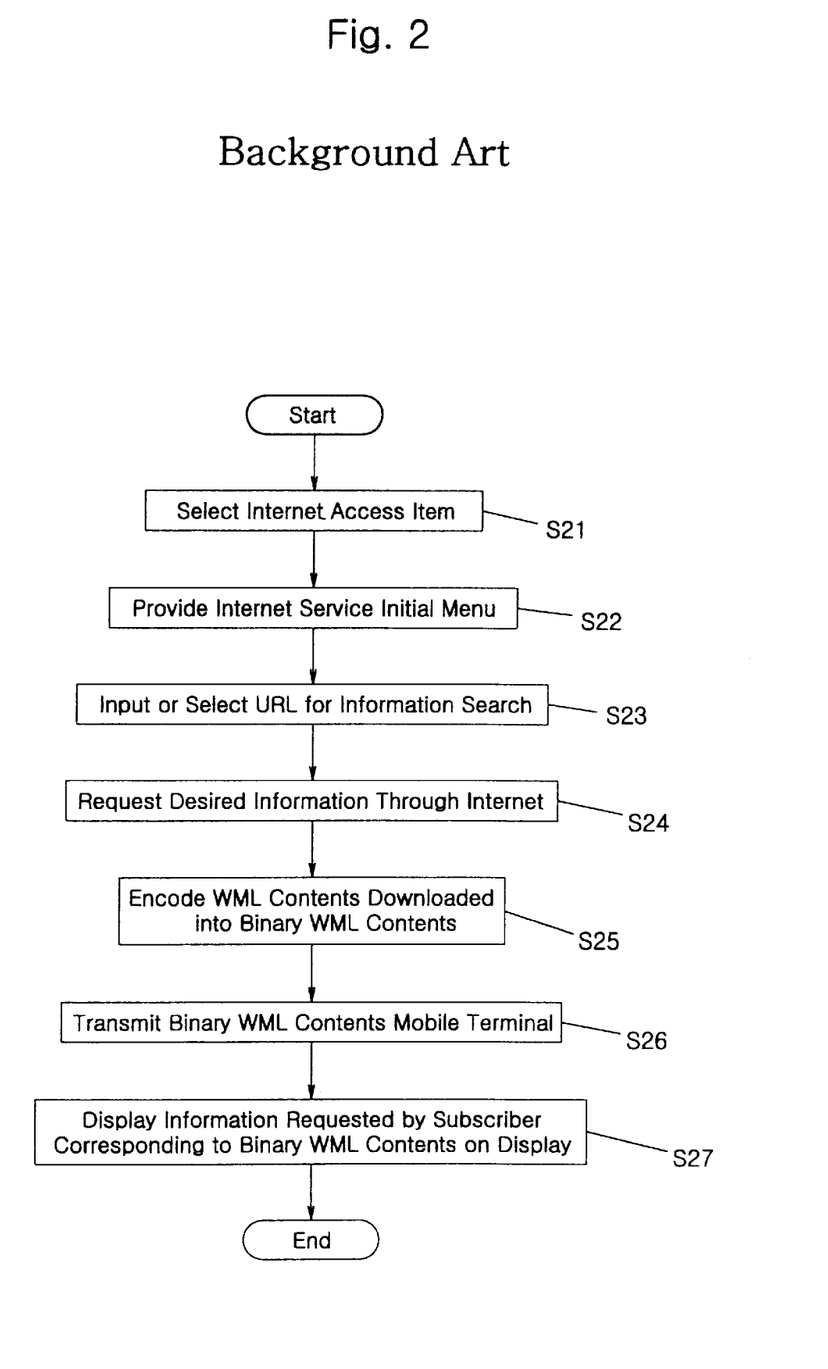
FIG. 2 is a diagram that shows a related art procedure of processing wireless Internet service according to a WAP standard.

FIG. 2 shows a related art wireless Internet service processing procedure according to the standard defined by the WAP Forum. After beginning, a corresponding radio communication network subscriber selects an item for Internet access using the mobile terminal 11 (Step S21). Then the WAP gateway system 13 provides the initial menu for the Internet service to the mobile terminal 11 (Step S22). The subscriber inputs or selects a Uniform Resource Locator (URL) for searching for desired information according to the initial menu (Step S23). Here, binary WML contents are used between the mobile terminal 11 and WAP gateway system 13.

Accordingly, the WAP gateway system 13 decodes the binary WML contents received from the mobile terminal 11 into WML contents, and then transmits the decoded WML contents to the web server 14 constructed of Handheld Device Markup Language (HDML) or WML using the HTTP protocol through the Internet (Step S24). Additionally, the WAP gateway system 13 encodes the WML contents downloaded from the web server 14 into binary WML contents (Step S25) according to the corresponding requested information. The WAP gateway system 13 then sends them to the mobile terminal 11 through the radio communication network using the WAP protocol (Step S26). Upon reception of the encoded binary WML contents from the WAP gateway system 13, the mobile terminal 11 converts the binary WML contents, which is the information the subscriber requests, into a form capable of being visually confirmed and displays it on the display thereof (Step S27). The mobile terminal 11 provides wireless Internet service that furnishes subscriber information requests and displays the functions using the WAP protocol and WAP browser function.

As described above, the related art radio communication network that provides Internet services to a mobile terminal has various disadvantages. To accept the wireless Internet service, as described above, most of the related art radio communication network subscribers should replace their current mobile terminals being used with new ones because the mobile terminals are required to furnish the WAP protocol and browser function.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a wireless Internet service method in a gateway system that stores and manages the latest URL web contents in a URL memory using a Time To Live (TTL), expire time and last modification time of URL web contents to provide quick Internet service for the latest web contents when a mobile terminal supporting no WAP standard requests information.

Another object of the present invention to provide a wireless Internet service method in a gateway system that stores and manages the latest URL web contents in a URL memory using a TTL, expire time and last modification time of URL web contents to inform a subscriber when bookmarked URL information defined by the subscriber is changed.

To accomplish at least the above objects in a whole or in part according to the present invention, there is provided a wireless Internet service providing method in a gateway system having a conversation function according to short messages, the method including storing and managing the latest URL web contents in a URL memory using a TTL, an expire time and a last modification time for URL web contents; parsing web contents corresponding to URL information requested by a mobile terminal and storing them in a cache having the form of a card; and transmitting the data stored in the cache to the mobile terminal through I-SMSC.

To further achieve the above objects in a whole or in part accordingly to the present invention, storing and managing the latest URL web contents in a URL memory includes sequentially searching records of the URL memory to confirm if there is a record whose expire time has been passed or whose TTL is not available; when there is the record whose expire time has been passed or whose TTL is not available, performing URL access through the Internet to collect the latest URL web contents corresponding to the record; and updating the expire time of a record updated into URL web contents whose expire time is defined among the collected URL web contents.

To further achieve the above objects in a whole or in part accordingly to the present invention, parsing and storing URL web contents corresponding to URL information requested by a mobile terminal includes updating parameters of the service session requested to be connected; analyzing a URL identification number of URL information requested for receiving Internet service to confirm if the request is for processing an inner menu; searching for an action-key included in the requested URL information to confirm if the action-key exists in the URL memory when the request is not for processing the inner menu; reading URL web contents stored in corresponding record when the action-key exists in the URL memory; and parsing the read URL web contents and storing them in the cache having the form of a card.

To further achieve the above objects in a whole or in part accordingly to the present invention a method of providing wireless Internet and Intranet service in a gateway system to a mobile terminal, the method comprising storing and managing a latest web contents in a memory using a first, second and third validation times for web contents, packaging selected web contents corresponding to web information requested by a mobile terminal and storing them in the memory, and transmitting the packaged data in the memory to the mobile terminal through a radio communication network.

To further achieve the above objects in a whole or in part accordingly to the present invention a radio communication system, comprising a mobile terminal that does not support a first protocol, a web server coupled to provide access to the Internet, a gateway system that provides corresponding web contents from one of an Internet access and an Intranet access using the first protocol while communicating with the web server, and provides the corresponding web contents to the mobile terminal using a second protocol, wherein the corresponding web contents are responsive to a request from the mobile terminal.

To further achieve the above objects in a whole or in part accordingly to the present invention a method for providing wireless Internet and Intranet service to a mobile terminal, comprising accessing a network common carrier upon receipt of a session connection request from the mobile terminal to confirm an identification of mobile terminal and update session parameters, determining when web information is requested in the session, whether the web information is from one of first and second menus, packaging earlier periodically generated web contents from a memory when the web information is from the first menu, identifying whether a prescribed key in the web information exists in the memory when the web information is from a second menu, wherein corresponding periodically generated data including web contents are packaged when the prescribed key exists in the memory, accessing web contents responsive to the web contents request through the Internet or the Intranet when the web information is not on previously found in the memory, and transmitting the packaged web contents directly responsive to the web contents request and transmitting the accessed web contents upon receipt and packaging to the mobile terminal, wherein the mobile terminal does not support a wireless application protocol and browser.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
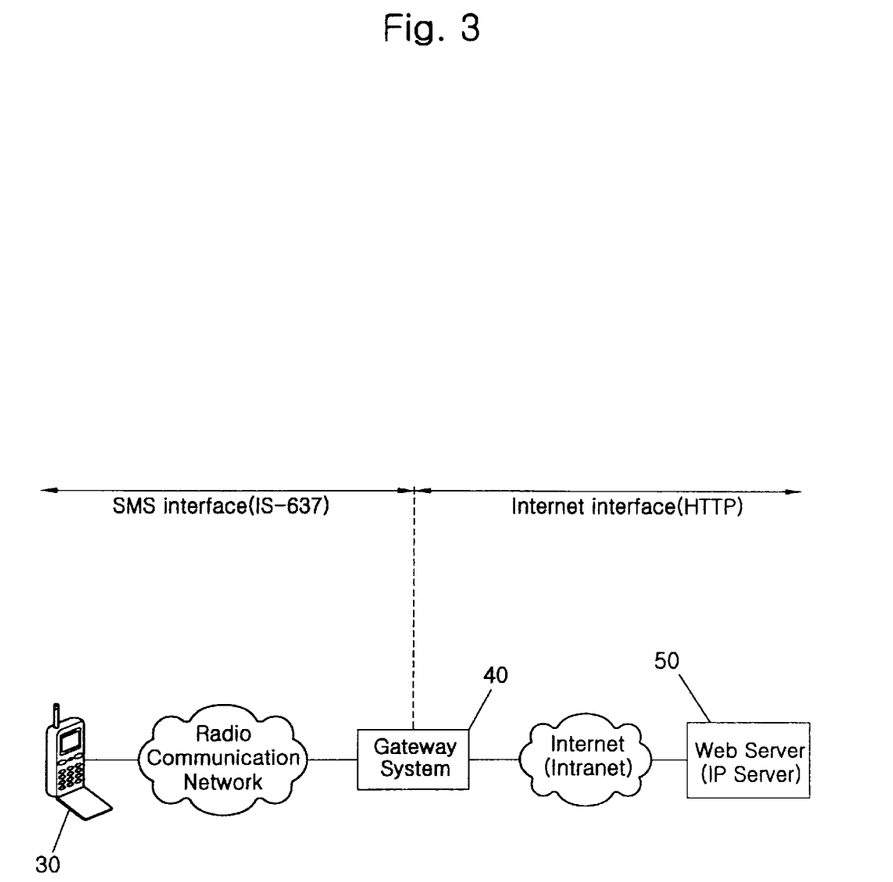
FIG. 3 is a diagram that shows a preferred embodiment of a system that accesses wireless Internet according to the present invention.

As shown in FIG. 3, a preferred embodiment of a configuration for accessing a wireless Internet according to the present invention includes a web server (IP server) 50, a gateway system 40 and a mobile terminal 30. The web server 50 functions as a repository for WML contents and generates a Common Gateway Interface (CGI) script for the WML contents. The gateway system 40 of compiles the W-IL contents and encodes/decodes the WML contents into short messages and vice versa. The mobile terminal 30 communicates with the gateway system 40 according to a user agent. The mobile terminal 30 is coupled with the gateway system 40 using a SMS interface (e.g. preferably Interim Standard-637 (IS-637)) function through a radio communication network, and the gateway system 40 is coupled with the web server 50 using an Internet interface (HTTP) function through the Internet (Intranet). However, the present invention is not intended to be so limited. Any applicable SMS or radio interface can be used that supports the functionality required for wireless communication between the Mobile Terminal and the Gateway System. Similarly, any interface standard that support the communications between the Gateway System and the Internet can be used (e.g., HTTP). Specifically, the mobile terminal 30 is preferably coupled with the gateway system 40 through an Interaction SMS Center (I-SMSC), using a conversation function according to short messages of the SMS interface to request predetermined URL information, and the gateway system 40 provides wireless Internet services including a directory service, which is available even if the mobile terminal 30 does not support the WAP protocol and browser.

Figure 4:
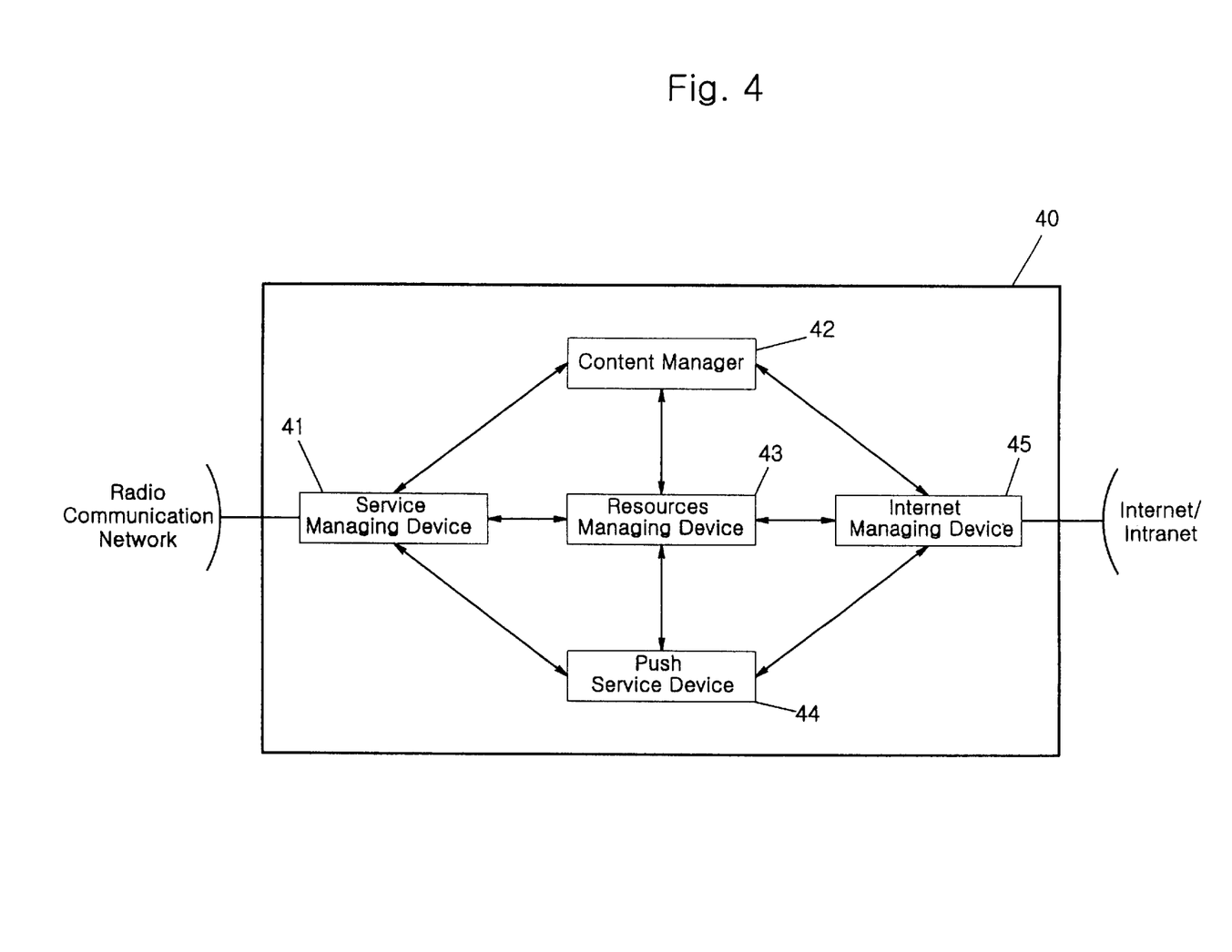
FIG. 4 is a block diagram showing a preferred embodiment of a gateway system of FIG. 3 that provides wireless Internet services.

As shown in FIG. 4, a preferred embodiment of a gateway system 40 for providing the wireless Internet service includes a service managing device 41, a content manager 42, resources managing device 43, a push service device 44 and an Internet managing device 45. The service managing device 41, which is preferably coupled to the related art infrastructure of a network common carrier and manages service session (e.g. logical connection for conversation), carries out an information request/response handling function, a history managing function, a No. 7 interface function or the like, and a function of connecting with an I-SMSC, SMSC or inter-working function (not shown). The content manager 42 processes requests from subscribers and web contents collected according to the requests. The content manager 42 performs a subscriber request classifying function, content initializing function and a cache function for managing a variety of URL web contents. The various URLs preferably mean a URL corresponding to bookmark information defined by subscribers for receiving quick services, a URL corresponding a menu assigned inside the system and a URL for the web contents collected according to the subscriber's requests.

The resources managing device 43 manages entire resources of the system and an initial service menu. The resources managing device 43 carries out a function of providing the initial service menu, that is, directory service menu, a bookmark managing function, an electronic mail/facsimile transmission/reception function, a subscriber's database area assigning function, a function of collecting information according to requests from the subscribers, a billing data/Network Management Subsystem (NMS) data managing function, and a statistic handling function.

The push service device 44 actively checks bookmarked URL information included in a service item defined by a subscriber, and when there is an update of URL information, informs the subscriber of the updated URL information. The Internet managing device 45 accesses the Internet (Intranet) to collect URL web contents requested by a subscriber and transmits them to the content manager 42.

A preferred embodiment of a method for providing a wireless Internet service in a gateway system according to the present invention will now be described. The preferred embodiment of the data processing procedure using the gateway system can be used, for example, in the preferred embodiments of a configuration for accessing a wireless Internet and the gateway system described above. In the gateway system 40, the data processing procedure is carried out on the basis of the Internet service and directory service being provided to a general mobile terminal (e.g. mobile terminal 30) that does not support a WAP protocol and browser.

Figure 5:
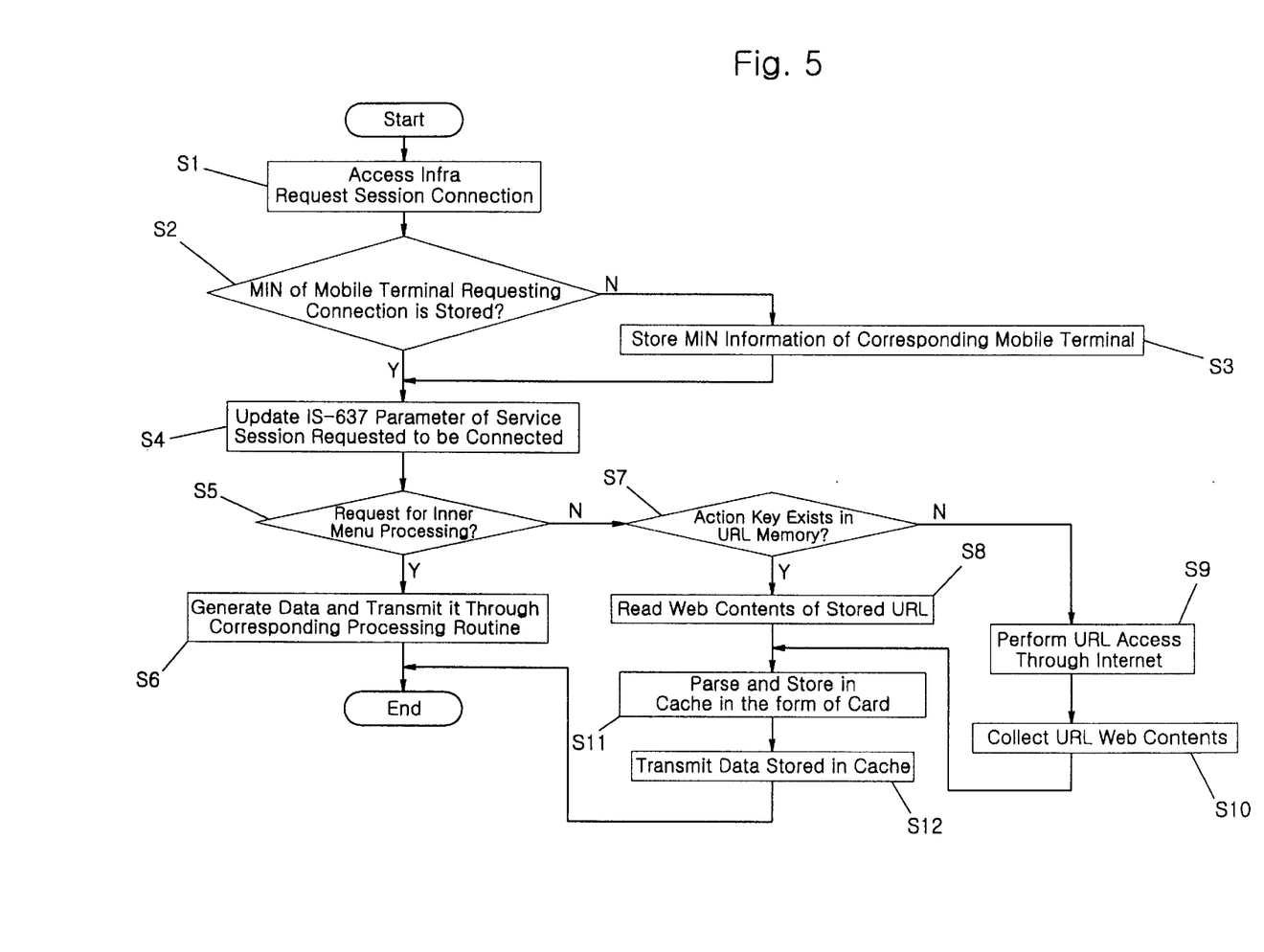
FIG. 5 is a flow chart that shows a data processing procedure for wireless Internet service in a gateway system according to a preferred embodiment of the present invention.

FIG. 5 is a flow chart that shows the preferred embodiment of a data processing procedure for the wireless Internet service in the gateway system 40. After beginning, to provide the Internet service, the gateway system 40 first accesses the related art infrastructure of a network common carrier to request session connection for a subscriber (Step S1). When an I-SMSC requests the session connection, the Mobile Identification Number (MIN) database is searched to determine whether the MIN information on the mobile terminal 30 of the subscriber who requests session connection, is stored (Step S2). If it is determined (Step S2) that the MIN information on the mobile terminal 30 who requested the session connection is not stored, that is, the mobile terminal 30 is requesting the session connection for the first time, the resources managing device of the gateway system 40 stores the MIN information on the mobile terminal (first time) in the MIN database (Step S3).

Upon storage of the MIN information on the mobile terminal 30 requesting the session connection (Step S3), the gateway system 40 updates the IS-637 parameter of the service session requested to be connected. Preferably, in the new service session, the gateway system 40 generates corresponding session identification number, assigns session sequence to '0' and then updates the IS-637 parameter. If it is determined (Step S2) that the service session is not a new one, the gateway system 40 updates the corresponding IS-637 parameter (Step S4).

Subsequently, when the mobile terminal 30 requests specific URL information related with the Internet services, the content manager 42 of the gateway system 40 analyzes the requested URL information to confirm if it is for processing the inner menu (Step S5). When it is determined that the request is for inner menu processing (Step S5), the content manager 42 generates URL information to be provided to the mobile terminal 30 through a corresponding processing routine to transmit the generated URL information through the service managing device 41 to I-SMSC (Step S6). Here, the content manager 42 generates data to be furnished to the mobile terminal 30 through one of a bookmark processing, system menu processing, electronic mail processing and user input processing routines according to a URL identification number corresponding to a result obtained by analyzing the requested URL information.

When it is determined that the URL information is not for processing the inner menu (Step S5), that is, the URL information is for processing the external menu, the content manager 42 of the gateway system 40 searches for an action-key included in the requested URL information to confirm if the action-key exists in a URL memory (Step S7). At this time, preferably the inner cache is first checked and, when it does not exist therein, the URL database is checked. When it is determined (Step S7) that the action-key exists in the URL memory, the gateway system 40 reads URL web contents stored in a corresponding record, i.e., requested web contents (Step S8), parses the read web contents to store them into a cache in the form of card (Step S11), and transmits the data stored in the cache to the I-SMSC (Step S12).

When it is determined (Step S7) that the action-key does not exist in the URL memory, the Internet managing device 45 of the gateway system 40 generates a URL interface packet for HTTP processing for connection of a web server 50 through the Internet to perform the requested URL access (Step S9). The Internet managing device 45 of the gateway system 40 collects URL web contents from the web server 50 through the Internet (Step S10) to transmit them to the content manager 42. Then, the content manager 42 formats the collected web contents into a form capable of being displayed on the mobile terminal 30, parses and stores it into the cache preferably in the form of card (Step S11), and then transmits the web contents parsed to be stored in the cache to the I-SMSC through the service managing device 41 (Step S12) and the process ends.

As described above, in the preferred embodiment of a procedure for performing data processing for the wireless Internet service can provide more effective and faster service to the subscribers. A gateway system according to the preferred embodiments updates corresponding URL information into (1) new information to manage it by applying cache algorithm to a URL corresponding to bookmarked information defined by a corresponding subscriber, (2) a URL corresponding to a menu assigned inside the system, (3) or a URL previously collected due to the request from a subscriber. In other words, the gateway system 40, upon requests from subscribers for access, searches the URL memory to confirm if the requested URL web contents exist in the URL memory. When they are, the gateway system 40 reads the URL web contents stored in a corresponding record of the URL memory and furnishes the data that the subscriber requests. When there is no web contents requested in the URL memory, the gateway system 40 accesses the web server 50 through the Internet to perform HTTP processing to collect the URL web contents and provides URL information as the subscriber requests using the collected URL web contents and thereby provide quick wireless Internet service to a mobile terminal 30.

Figure 6:
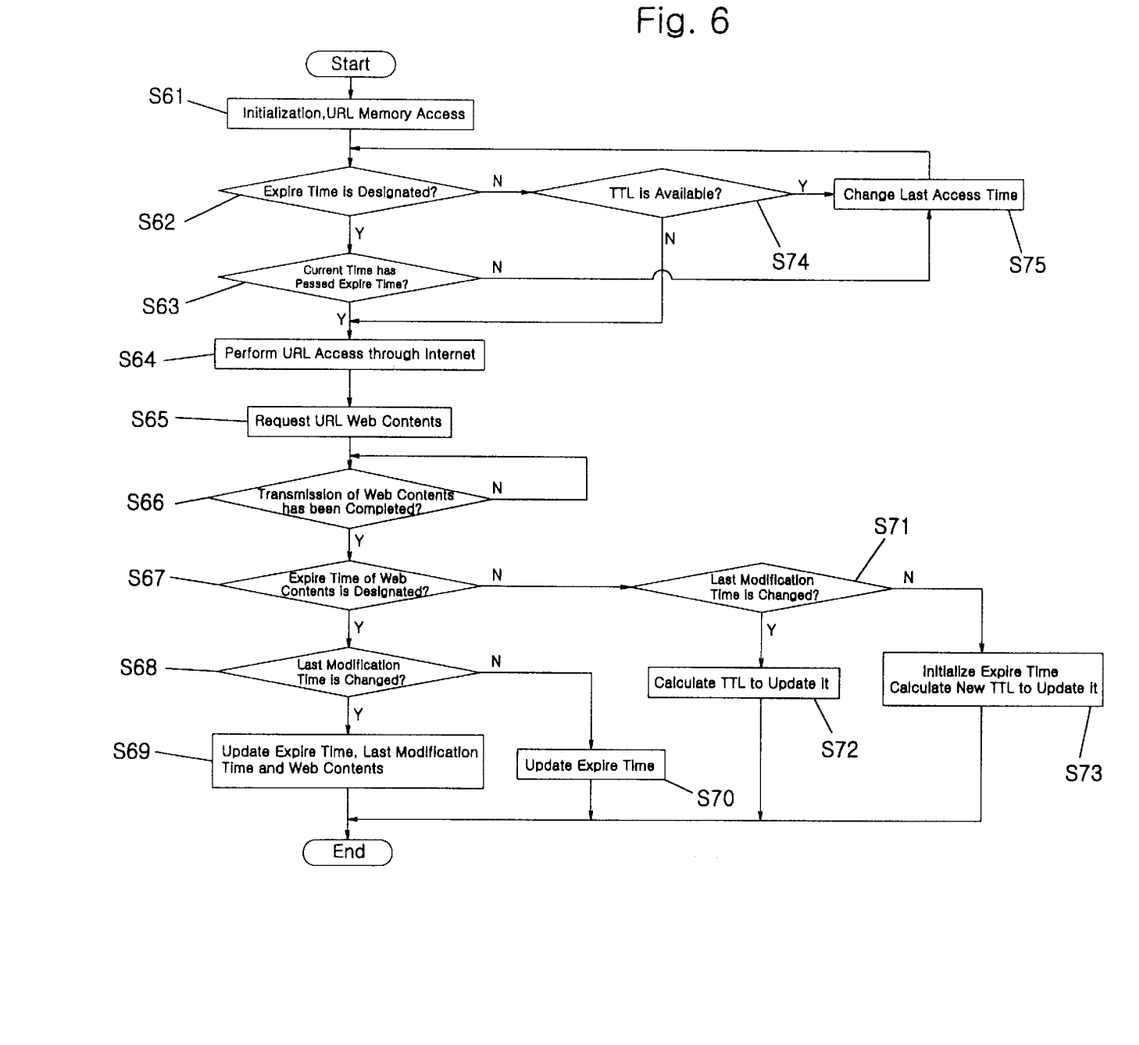
FIG. 6 is a flow chart that shows a preferred embodiment of a URL memory managing procedure for wireless Internet service in the gateway system according to the present invention.

A preferred embodiment of a URL memory managing operations of a gateway system for processing the wireless Internet service will now be described. The preferred embodiment of a URL memory managing operation can be used, for example, in the preferred embodiments described above. As shown in FIG. 6, after beginning, the content manager 42 of the gateway system 40 reads registration information through a configuration file or the like to initialize the process and accesses the URL memory (Step S61). The content manager 42 sequentially searches records stored in the URL memory at a predetermined period of time to confirm if an expire time of each record is designated (Step S62). Preferably, each record of the URL memory stores periodically updated URL web contents. Where the expire time of each record is designated (Step S62), the content manager 42 will confirm if the current time has passed the expire time (Step S63). When it is determined that the expire time has been passed (Step S63), the Internet managing device 45 performs HTTP processing to carry out URL access of the web service 50 through the Internet (Step S64), to thereby request URL web contents corresponding to the record whose expire time has passed (Step S65).

Subsequently, the gateway system 40 confirms if transmission of the URL web contents requested through the Internet from the web server 50 has been completed (Step S66). When transmission is complete, the web contents are sent to the content manager 42. Then, the content managing means 42 analyzes the latest URL web contents to search areas for a HTTP header and body, to thereby confirm if the expire time of corresponding web contents is designated (Step S67). When it is determined that the expire time is designated (Step S67), the content manager 42 confirms if the last modification time of the latest URL web contents is changed (Step S68). When it is determined that the last modification time is changed (Step S68), the content manager 42 updates the expire time of the record and the last modification time, and at the same time, updates the previous URL web contents into the latest URL web contents (Step S69). When the last modification time is not changed (Step S68), the content manager 42 updates only the expire time of the record (Step S70).

When the expire time of the web contents is not designated (Step S67), the content manager 42 of the gateway system 40 confirms whether the last modification time of the latest URL web contents is changed (Step S71) and, when it is, calculates the TTL (Time To Live) thereof to update them (Step S72). On the other hand, when the last modification is not changed (Step S71), the content manager 42 initializes the expire time of the record and calculates new TTL for updating same (Step S73).

When the expire time of the record is not designated (Step S62), the content manager 42 or the like of the gateway system 40 confirms if the TTL of the record is available (Step S74). Preferably, the availability of the TTL is confirmed by using the difference between the current time and a last modification time. For example, it is recognized that the TTL is not available when the difference between the current time and last modification time is larger than the TTL but available when it is smaller than the TTL. In cases where the TTL of the corresponding record is confirmed to be available (Step S74), the gateway system 40 recognizes the URL web contents stored in the record to be available so as to change the last access time (Step S75), and then returns to searching the next record (Step S62) to repeat the process.

In cases where it is confirmed that the TTL of the record is not available (Step S74), however, the Internet managing device 45 or the like performs URL access through the Internet (Step S64), to thereby request URL web contents corresponding to a record confirmed. Meanwhile, when the current time has not passed the expire time of the record (Step S63), the content manager 42 of the gateway system 40 recognizes that the URL web contents stored in the record are available so as to change the last access time (Step S75), and then returns to searching the next record (Step S64) to repeat the process. As described above, the content manager of a gateway system (e.g., content manager of the gateway system 40) according to the preferred embodiments sets the next access time for the URL memory using the TTL, expire time and last modification time for management of the URL memory, and accesses the URL memory at the access time set to update URL web contents stored for each record into the latest information. Accordingly, the gateway system 40 can provide wireless Internet service for subscriber's requests only using the URL web contents stored for each record of the inner URL, memory thereof without directly accessing the Internet. Furthermore, when bookmarked URL information defined by a subscriber is changed, the push service device of the gateway system 40 informs the mobile terminal 30 that the bookmarked URL information is updated via the service managing device 41 and I-SMSC, to thereby provide services for updated URL information to the subscriber.

Through the preferred embodiments of a URL memory management and wireless Internet service procedures described above, the gateway system 40 can provide menu service/URL direct moving screen use service, bookmark service, electronic mail sending/inquiry service, address list management service and facsimile transmission/reception service. The menu service/URL direct moving screen use service furnishes a directory menu capable of searching web contents previously defined by a radio communication network common carrier or defined by a subscriber, to support easy web searching. The bookmark service which performs a bookmarking function on a browser manages the bookmark history by subscribers. The electronic mail sending/inquiry service provides a function of allowing a mobile terminal to send or inquire electronic mails directly. The address list management service provides a function capable of managing the address list of a subscriber, and the facsimile transmission/reception service furnishes a function of allowing the mobile terminal to transmit or receive facsimile information directly.

As described above, the preferred embodiments of a mobile communication gateway system and method according to the present invention have various advantages. The preferred embodiments can be used for a mobile terminal that does not support a WAP standard. The preferred embodiments of a mobile communications system, a gateway system and methods for providing data access procedures can store and manage the latest URL web contents in the URL memory using the TTL, expire time and last modification time for URL web contents to directly access the Internet. When there is a request for URL information from a mobile terminal supporting no WAP standard for URL information which does not exist in the URL memory, the preferred embodiments perform URL access through the Internet to collect URL web contents to provide the URL web contents to the mobile terminal. Accordingly, rapid Internet service for the last web contents is available and, in case of an update of bookmarked URL information defined by a subscriber, it is possible to inform the subscriber of the updated URL information.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of providing wireless Internet and Intranet service in a gateway system to a mobile terminal, the method comprising:

storing and managing latest web contents in a memory using a first, second and third validation times for web contents;

packaging selected web contents corresponding to web information requested by a mobile terminal and storing them in the memory; and transmitting the packaged data in the memory to the mobile terminal through a radio communication network, wherein the storing and managing the latest web contents in the memory comprises:

searching records of the memory to select records whose first validity time has been passed or whose second validity time is not available;

performing access through the Internet to collect the latest web contents corresponding to the selected records; and updating the first validity time of each of the selected records whose first validity time is defined among the collected web contents.

2. The method of claim 1, wherein the searching records determines whether a current time has been passed the first validity time when the first validity of the record is designated and determines whether the second validity time is available when the first validity time is not designated.

3. The method of claim 1, wherein when the first validity time of the record has not been passed or the second validity time is available, a last access time of the corresponding record is updated to a current time.

4. The method of claim 1, wherein performing access through the Internet to collect the latest web contents corresponding to the selected records comprises updating the second validity time of the selected record in the collected latest web contents whose first validity time is not designated.

5. The method of claim 4, wherein the updating the second validity time of the selected record in the collected web contents comprises calculating the second validity time to update the second validity time of the selected record when the last modification time of the collected web contents is changed, and initializing the first validity time and calculating a new second validity time of the selected record when the last modification time of the collected web contents is not changed.

6. The method of claim 1, wherein the updating the first validity time of each of the selected records whose first validity time is designated among the collected web contents comprises updating the first validity time, the second validity time and a last modification time when the last modification time of the collected web contents is changed, and the first validity time is updated when the last modification time is not changed.

7. The method of claim 1, wherein the step of packaging selected web contents corresponding to the web information requested by the mobile terminal comprises:

updating parameters of a requested service session upon connection;

analyzing an identification number of the web information requested for receiving Internet service to determine if the request is for processing a first menu;

searching for a prescribed key included in the requested web information to determine if the prescribed key exists in the memory when the request is not for processing the first menu;

reading the web contents stored in a corresponding record when the prescribed key exists in the memory; and packaging the read web contents from the corresponding record and storing them in a second memory.

8. The method of 7, wherein when the prescribed key does not exist in the memory, the packaging selected contents comprises performing access through the Internet to collect the selected web contents, packaging the collected web contents and storing them in the second memory.

9. The method of claim 7, wherein the searching for the prescribed key confirms when the prescribed key exists in an inner cache of the memory, the prescribed key exists in a URL database.

10. The method of claim 7, wherein when the request is for the first menu processing as determined by a URL identification number of the requested web information, the web information is generated to be transmitted through one of a bookmark processing, a system menu processing, an electronic mail processing, and a user input processing routines according to the identification number.

11. The method of claim 1, wherein the mobile terminal does not support a standardized process for the Internet and the Intranet access.

12. The method of claim 11, wherein the mobile terminal does not support a wireless application protocol and browser.

13. A radio communication system, comprising:

a mobile terminal that does not support a first protocol;

a web server coupled to provide access to an Internet connection; and a gateway system that provides corresponding web contents from one or more of an Internet access and an Intranet access using the first protocol while communicating with the web server, and provides the corresponding web contents to the mobile terminal using a second protocol, wherein the corresponding web contents are responsive to a request from the mobile terminal, wherein the gateway system comprises, a memory comprising validity time records, a content manager that calculates whether said validity time records are valid, and an internet managing device that collects web contents if said time validity records are invalid, wherein said content manager updates said validity time records when said interact managing device collects web contents.

14. The radio communication system of claim 13, wherein the mobile terminal does not support a wireless application protocol and a browser, and wherein the gateway system using the second protocol provides the corresponding web contents to the mobile terminal upon receipt of the request.

15. A method for providing wireless Internet and Intranet service to a mobile terminal, comprising:

accessing a network common carrier upon receipt of a session connection request from the mobile terminal to confirm an identification of mobile terminal and update session parameters;

determining when web information is requested in the session, whether the web information is from one of first and second menus;

packaging earlier periodically generated web contents from a memory when the web information is from the first menu;

identifying whether a prescribed key in the web information exists in the memory when the web information is from a second menu, wherein corresponding periodically generated data including web contents are packaged when the prescribed key exists in the memory;

accessing web contents responsive to the web contents request through the Internet or the Intranet when the web information is not previously found in the memory; and transmitting the packaged web contents directly responsive to the web contents request and transmitting the accessed web contents upon receipt and packaging to the mobile terminal, wherein the mobile terminal does not support a wireless application protocol and browser.

16. A method of providing Wireless Internet and Intranet service in a gateway system to a mobile terminal, the method comprising:

storing and managing latest web contents in a memory using a first, second and third validation times for web contents;

packaging selected web contents corresponding to web information requested by a mobile terminal and storing them in the memory;

transmitting the packaged data in the memory to the mobile terminal through a radio communication network, wherein the step of packaging selected web contents corresponding to the web information requested by the mobile terminal comprises:

updating parameters of a requested service session upon connection;

analyzing an identification number of the web information requested for receiving Internet service to determine if the request is for processing a first menu;

searching for a prescribed key included in the requested web information to determine if the prescribed key exists in the memory when the request is not for processing the first menu;

reading the web contents stored in a corresponding record when the prescribed key exists in the memory; and packaging the read web contents from the corresponding record and storing them in a second memory.

17. The method of 16, wherein when the prescribed key does not exist in the memory, the packaging selected contents comprises performing access through the Internet to collect the selected web contents, packaging the collected web contents and storing them in the second memory.

18. The method of claim 16, wherein the searching for the prescribed key confirms when the prescribed key exists in an inner cache of the memory, the prescribed key exists in a URL database.

19. The method of claim 16, wherein when the request is for the first menu processing as determined by a URL identification number of the requested web information, the web information is generated to be transmitted through one of a bookmark processing, a system menu processing, an electronic mail processing, and a user input processing routines according to the identification number.

20. The radio communication system of claim 13, wherein said validity time records comprise:

a first time record corresponding to a time when said corresponding web contents expire based on corresponding web contents information; and a second time record corresponding to a preset time when said first time record is not provided by said corresponding web contents information.

21. The radio communication system of claim 13, wherein said gateway system updates parameters of a requested service session upon connection between said web server and said mobile terminal;

wherein said gateway system generates a corresponding session identification number which is analyzed to determine if a web information requests for receiving internet service is for processing a first menu;

wherein said content manager searches for a prescribed key included in a requested web information to determine if the prescribed key exists in the gateway system when the request is not for processing the first menu;

wherein said gateway system reads web contents stored in a corresponding record when the prescribed key exists in the gateway system; and wherein said content manager packages the read web contents from the corresponding record and stores them in said gateway system.

22. The method of claim 13, wherein said gateway system accesses a network common carrier upon receipt of a session connection request from the mobile terminal to confirm an identification of the mobile terminal and update session parameters;

wherein said gateway system determines whether web information is requested in the session and determines whether the information is from one of the first or second menus;

wherein said gateway system packages periodically generated web contents from the web server if the web information is from the first menu;

wherein said gateway system identifies whether a prescribed key in the web information exists in the gateway system if the web information is from the second menu, wherein corresponding periodically generated data including web contents are packaged when the prescribed key exists in the gateway system;

wherein said internet managing device accesses web contents request through the Internet or the Intranet if the web information is not previously found in the gateway system; and wherein said content manager transmits the packaged web contents directly responsive to the web contents request and transmits the accessed web contents upon receipt to the mobile terminal, wherein the mobile terminal does not support a wireless application protocol and browser.

* * * * *